(12) United States Patent
Smith, Jr. et al.

(10) Patent No.: US 8,102,306 B2
(45) Date of Patent: Jan. 24, 2012

(54) ACTIVE-RADAR-ASSISTED PASSIVE COMPOSITE IMAGERY FOR AIDING NAVIGATION OR DETECTING THREATS

(75) Inventors: Jerry Rosson Smith, Jr., Springfield, VA (US); Joseph R. Krycia, Pasadena, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 5 days.

(21) Appl. No.: 12/779,766

(22) Filed: May 13, 2010

(65) Prior Publication Data

US 2011/0279303 A1 Nov. 17, 2011

(51) Int. Cl.
*G01S 13/00* (2006.01)

(52) U.S. Cl. .............. 342/52; 342/53; 342/70; 342/146; 382/103

(58) Field of Classification Search ..................... 342/52, 342/53, 70, 146; 382/103
See application file for complete search history.

(56) References Cited

U.S. PATENT DOCUMENTS

| | | | |
|---|---|---|---|
| 4,086,616 A | 4/1978 | Catano et al. | |
| 5,072,396 A | 12/1991 | Fitzpatrick et al. | |
| 6,597,984 B2 | 7/2003 | Appenrodt et al. | |
| 6,621,764 B1 | 9/2003 | Smith | |
| 6,816,112 B1 | 11/2004 | Chethik | |
| 6,882,409 B1 | 4/2005 | Evans et al. | |
| 6,903,676 B1 | 6/2005 | Frady et al. | |
| 6,909,997 B2 | 6/2005 | Chen et al. | |
| 6,919,988 B2 | 7/2005 | Cook | |
| 6,944,566 B2 | 9/2005 | Chen et al. | |
| 7,049,998 B1 | 5/2006 | Frady et al. | |
| 7,053,928 B1 | 5/2006 | Connors et al. | |
| 7,170,442 B2 | 1/2007 | Lovberg et al. | |
| 7,290,710 B2 | 11/2007 | Betush et al. | |
| 7,298,869 B1 | 11/2007 | Abernathy | |
| 7,420,675 B2 | 9/2008 | Giakos | |
| 7,428,050 B2 | 9/2008 | Giakos | |
| 7,439,902 B2 | 10/2008 | Robertson et al. | |
| 2005/0270784 A1* | 12/2005 | Hahn et al. | 362/459 |
| 2007/0080850 A1* | 4/2007 | Abe et al. | 342/52 |
| 2007/0297696 A1* | 12/2007 | Hamza et al. | 382/294 |
| 2008/0084283 A1* | 4/2008 | Kalik | 340/435 |
| 2008/0215204 A1 | 9/2008 | Roy et al. | |
| 2009/0015460 A1 | 1/2009 | Fox et al. | |

OTHER PUBLICATIONS

"Mobile Surveillance System (MSS)," Manufacturer's Brochure No. 35674, 2 pages, indicated copyright of 2009, Telephonics Corporation, Electronic Systems Division, Huntington, NY.

* cited by examiner

*Primary Examiner* — Timothy A Brainard
(74) *Attorney, Agent, or Firm* — Howard Kaiser (57) ABSTRACT

Typical inventive practice provides for electronic communication of a computer with a display, an active radar device (for transmitting target-location data and environmental data), a light measurement device (for transmitting visual light data), and passive imaging devices covering bands in the visual, infrared (MWIR and/or LWIR), and millimeter wave regions of the electromagnetic spectrum. Inventive software in the computer's memory establishes "operational modes." Each operational mode is defined at least by a predominant environmental (obscuration and lighting) character, ascribes "modal indices" to individual imaging devices, and carries its own multispectral image fusion algorithm (which, pursuant to the ascribed modal indices, attributes weights to the imaging data from the respective imaging devices). The inventive software aims the imaging devices toward the target, selects an operational mode (based on the environmental data), and executes the image fusion algorithm associated with the selected operational mode so that a fused multispectral image is displayed.

20 Claims, 7 Drawing Sheets

| mode | prevailing lighting condition ||| prevailing visibility condition ||||||
|---|---|---|---|---|---|---|---|---|---|
| | daytime | twilight | nighttime | clear | drizzle | rain | snow/sleet/hail | moderate pollution | heavy pollution |
| 1 | X | | | X | | | | | |
| 2 | X | | | | X | | | | |
| 3 | X | | | | | X | | | |
| 4 | X | | | | | | X | | |
| 5 | X | | | | | | | X | |
| 6 | | | | | | | | | X |
| 7 | | X | | X | | | | | |
| 8 | | X | | | X | | | | |
| 9 | | X | | | | X | | | |
| 10 | | X | | | | | X | | |
| 11 | | X | | | | | | X | |
| 12 | | X | | | | | | | X |
| 13 | | | X | X | | | | | |
| 14 | | | X | | X | | | | |
| 15 | | | X | | | X | | | |
| 16 | | | X | | | | X | | |
| 17 | | | X | | | | | X | |
| 18 | | | X | | | | | | X |

FIG. 5

| mode | modal index visual | modal index MWIR | modal index LWIR | modal index mmW |
|---|---|---|---|---|
| 1 | 5 | 1 | 1 | 0 |
| 2 | 4 | 3 | 2 | 1 |
| 3 | 3 | 3 | 3 | 2 |
| 4 | 3 | 2 | 3 | 2 |
| 5 | 4 | 3 | 4 | 2 |
| 6 | 3 | 1 | 5 | 1 |
| 7 | 4 | 2 | 3 | 2 |
| 8 | 3 | 4 | 3 | 3 |
| 9 | 2 | 4 | 4 | 3 |
| 10 | 2 | 3 | 4 | 3 |
| 11 | 3 | 4 | 5 | 2 |
| 12 | 2 | 2 | 5 | 3 |
| 13 | 2 | 4 | 4 | 4 |
| 14 | 1 | 5 | 3 | 3 |
| 15 | 1 | 5 | 2 | 4 |
| 16 | 1 | 5 | 3 | 3 |
| 17 | 1 | 3 | 5 | 4 |
| 18 | 1 | 2 | 5 | 5 |

FIG. 7

| mode | modal index visual | modal index IR | modal index mmW |
|---|---|---|---|
| 1 | 5 | 1 | 0 |
| 2 | 4 | 3 | 2 |
| 3 | 3 | 4 | 3 |
| 4 | 3 | 4 | 3 |
| 5 | 4 | 3 | 3 |
| 6 | 3 | 4 | 2 |
| 7 | 4 | 2 | 3 |
| 8 | 3 | 4 | 4 |
| 9 | 2 | 5 | 4 |
| 10 | 2 | 5 | 4 |
| 11 | 3 | 4 | 3 |
| 12 | 2 | 5 | 4 |
| 13 | 2 | 3 | 3 |
| 14 | 1 | 5 | 4 |
| 15 | 1 | 5 | 5 |
| 16 | 1 | 5 | 4 |
| 17 | 1 | 4 | 5 |
| 18 | 1 | 3 | 5 |

| mode | prevailing lighting condition | | | prevailing visibility condition | | | | | | distance of target | |
|---|---|---|---|---|---|---|---|---|---|---|---|
| | day | twi | night | clear | driz | rain | s/s/h | mod poll | heavy poll | < 100 m | ≥ 100 m |
| 1 | X | | | X | | | | | | X | |
| 2 | X | | | | X | | | | | X | |
| 3 | X | | | | | X | | | | X | |
| 4 | X | | | | | | X | | | X | |
| 5 | X | | | | | | | X | | X | |
| 6 | X | | | | | | | | X | X | |
| 7 | | X | | X | | | | | | X | |
| 8 | | X | | | X | | | | | X | |
| 9 | | X | | | | X | | | | X | |
| 10 | | X | | | | | X | | | X | |
| 11 | | X | | | | | | X | | X | |
| 12 | | X | | | | | | | X | X | |
| 13 | | | X | X | | | | | | X | |
| 14 | | | X | | X | | | | | X | |
| 15 | | | X | | | X | | | | X | |
| 16 | | | X | | | | X | | | X | |
| 17 | | | X | | | | | X | | X | |
| 18 | | | X | | | | | | X | X | |
| 19 | X | | | X | | | | | | | X |
| 20 | X | | | | X | | | | | | X |
| 21 | X | | | | | X | | | | | X |
| 22 | X | | | | | | X | | | | X |
| 23 | X | | | | | | | X | | | X |
| 24 | X | | | | | | | | X | | X |
| 25 | | X | | X | | | | | | | X |
| 26 | | X | | | X | | | | | | X |
| 27 | | X | | | | X | | | | | X |
| 28 | | X | | | | | X | | | | X |
| 29 | | X | | | | | | X | | | X |
| 30 | | X | | | | | | | X | | X |
| 31 | | | X | X | | | | | | | X |
| 32 | | | X | | X | | | | | | X |
| 33 | | | X | | | X | | | | | X |
| 34 | | | X | | | | X | | | | X |
| 35 | | | X | | | | | X | | | X |
| 36 | | | X | | | | | | X | | X |

ACTIVE-RADAR-ASSISTED PASSIVE COMPOSITE IMAGERY FOR AIDING NAVIGATION OR DETECTING THREATS

BACKGROUND OF THE INVENTION

The present invention relates to electromagnetic imaging, more particularly to methods and devices involving fusion of images from plural electromagnetic spectral band regions.

Traditional approaches to navigating waters or detecting threats under low-light conditions have involved radar systems, infrared (IR) devices, or electro-optic/light-intensification (EO/LI) devices. Radar devices used for navigation/detection purposes are usually "active" in the sense that they transmit electromagnetic radiation—more specifically, radio signals—in order to receive reflected radio signals that are informative as to existence of targets (objects) and their whereabouts. IR devices and EO/LI devices used for such purposes are "passive" in the sense that they do not transmit electromagnetic radiation, but instead receive naturally occurring electromagnetic signals that are emanated or reflected by targets.

In the electromagnetic spectrum, the IR region is characterized by longer wavelengths than is the visual region, the IR region extending between the visual region and approximately one millimeter in wavelength. The millimeter wave region is characterized by longer wavelength than is the IR region, and is characterized by shorter wavelengths than is the "radar" (including microwaves and radio waves) region. Passive EO/LI devices operate in the visible spectrum. Passive IR devices are based on the phenomenon of natural radiation of IR energy by all "warm" objects in accordance with thermal radiative transfer physics. Passive millimeter wave (mmW) devices have more recently come under development and are similar in principle to passive IR devices, a major difference being that mmW energy emissions by objects are at longer wavelengths than are IR emissions.

Operational effectiveness of passive (non-transmitting) imaging devices can be severely inhibited by atmospheric obscurants (e.g., particulate matter) characterizing inclement weather or air pollution. Obscurants can be precipitational (e.g., wet particulates) or non-precipitational (e.g., dry particulates). Examples of atmospheric obscurants include mist, fog, haze, dust, smoke, rain, drizzle (light rain), snow, snow grains, snow pellets, ice pellets (sleet), hail, etc.

Every kind of imaging device has its attributes and shortcomings. Passive mmW devices are advantageous over passive IR devices and passive EO/LI devices insofar as propagation of mmW energy is unaffected (or nearly unaffected) by environmental conditions that scatter or otherwise impede propagation of IR energy and visible light. Active radar devices share with passive mmW devices the quality of not suffering significant obscuration during adverse environmental propagative conditions.

Visual and IR devices are impaired by adverse conditions (e.g., inclement weather) and are thus ineffective for navigational systems under such conditions. Of all of the imaging devices, visual light devices can afford the highest image detail; on the other hand, visual spectrum systems operate during daytime only, are impaired by adverse weather/particulates, and are limited in range by the visual acuity of the device and the size of the target.

Similarly, IR devices provide good image detail, can be impaired by adverse weather/particulates, and are limited in range by the visual acuity of the device and the size of the target; however, as distinguished from visual devices, IR devices can operate in either day or night. Like IR devices, mmW devices can operate in either day or night; unlike IR devices, mmW devices afford marginal image detail, can operate in all weather/particulate conditions, and are limited to short range use.

Radar devices can operate in day or night and in all weather/particulate conditions. In addition, radar can yield range, speed, and course data, over time. However, radar provides no image detail, and active radar is limited to line-of-sight sensing. Furthermore, an active radar device requires a quantity of radar energy to be transmitted therefrom in order to illuminate objects such as navigational obstacles. This actively emitted radar energy can be collected by other sensors, and thus can be counterproductive to concealment of the entity (e.g., ship or other vehicle) from which the radar is being transmitted.

Generally speaking, the notion is well appreciated in the literature that image data from plural electromagnetic spectral band regions can be combined ("fused") so as to take advantage of the respective sensory strong suits in the different spectral band regions. The following two textbooks, incorporated herein by reference, are informative about image fusion, i.e., the combination of image data from plural spectral band regions: Rick S. Blum and Zheng Uu, *Multi-Sensor Image Fusion and Its Applications*, CRC Press, 2005; Tania Stathaki, *Image Fusion: Algorithms and Applications*, Academic Press, 2008.

Also notable regarding image fusion are the following United States patent documents, each of which is incorporated herein by reference: Catano et al. U.S. Pat. No. 4,086,616 issued 25 Apr. 1978; Fitzpatrick et al. U.S. Pat. No. 5,072,396 issued 10 Dec. 1991; Smith U.S. Pat. No. 6,621,764 B1 issued 16 Sep. 2003; Appenrodt et al. U.S. Pat. No. 6,597,984 B2 issued 22 Jul. 2003; Chethik U.S. Pat. No. 6,816,112 B1 issued 9 Nov. 2004; Evans et al. U.S. Pat. No. 6,882,409 B1; Frady et al. U.S. Pat. No. 6,903,676 B1 issued 7 Jun. 2005; Chen et al. U.S. Pat. No. 6,909,997 B2 issued 21 Jun. 2005; Cook U.S. Pat. No. 6,919,988 B2 issued 19 Jul. 2005; Chen et al. U.S. Pat. No. 6,944,566 B2 issued 13 Sep. 2005; Frady et al. U.S. Pat. No. 7,049,998 B1 issued 23 May 2006; Connors et al. U.S. Pat. No. 7,053,928 B1 issued 30 May 2006; Lovberg et al. U.S. Pat. No. 7,170,442 B2 issued 30 Jan. 2007; Betush et al. U.S. Pat. No. 7,290,710 B2 issued 6 Nov. 2007; Abernathy U.S. Pat. No. 7,298,869 B1 issued 20 Nov. 2007; Giakos U.S. Pat. No. 7,420,675 B2 issued 2 Sep. 2008; Roy et al. U.S. Patent Application Publication 2008/0215204 A1 published 4 Sep. 2008; Giakos U.S. Pat. No. 7,428,050 B2 issued 23 Sep. 2008; Robertson et al. U.S. Pat. No. 7,439,902 B2 issued 21 Oct. 2008; Fox et al. U.S. Patent Application Publication 2009/0015460 A1 published 15 Jan. 2009.

SUMMARY OF THE INVENTION

In view of the foregoing, an object of the present invention is to provide improved method and apparatus for fusing image data from various spectral band regions.

The present invention is typically embodied as a method, or system, or computer program product for effecting multi-spectral imaging. According to typical inventive practice, a computer communicates with a computer display, a radar device, a visual light measurement device, and various imaging devices. The imaging devices include a visual imaging device, an infrared imaging device, and a millimeter wave imaging device. According to some inventive embodiments, the infrared imaging device includes a mid-wave infrared imaging device and a long-wave infrared imaging device.

According to typical inventive practice, a set of operational modes is established, such as by inventive computer software resident in the computer. Each operational mode: corresponds to circumstance including a prevailing environmental character as generally exists between a target and plural imaging devices; is characterized by modal indices individually assigned to the imaging devices; and, has associated therewith an image fusion algorithm for performing multispectral imaging of the target. The prevailing environmental character includes a prevailing obscuration character and a prevailing visual lighting character. The modal indices are indicative of weighting, by the associated image fusion algorithm, of imaging data respectively obtainable from the imaging devices.

According to typical inventive practice, target location data is obtained by the computer from the radar device, visual light data is obtained by the computer from the visual light measurement device, and environmental data is obtained by the computer from the radar device. The target location data is informative of the location of the target, the visual light data is informative of the prevailing visual lighting character, and the environmental data is informative of the prevailing environmental character.

According to typical inventive practice, at least two imaging devices are aimed by the computer toward the target. The aiming by the computer of the imaging devices is based on the target location data obtained by the computer. According to some inventive embodiments, all of the imaging devices are aimed toward the target, and imaging data is obtained from all of the imaging devices. According to some inventive embodiments, only those said imaging devices whose imaging data are to be fused are aimed toward the target, and imaging data is obtained from all of the imaging devices thus aimed. According to some inventive embodiments, all of the imaging devices are aimed toward the target, but imaging data is obtained only from the imaging devices whose imaging data are to be fused.

According to typical inventive practice, an operational mode is selected by the computer. The selection of the operational mode is based on the environmental data obtained by the computer. According to some inventive embodiments, the circumstance to which each operational mode corresponds additionally includes the distance of the target from the imaging devices, and the selection of the operational mode is additionally based on the target location data obtained by the computer.

According to typical inventive practice, the image fusion algorithm that is associated with the selected operational mode is executed by the computer. The execution of the associated operational mode includes obtaining imaging data from at least two of the aimed imaging devices, fusing the obtained imaging data, and displaying (e.g., on a computer display) an image representative of the fusion of the obtained imaging data.

The present invention, as typically embodied, uniquely features, inter alia: radar to locate a target and to assess the target's ambient conditions in terms of obscuration (especially, horizontal obscuration); light measurement to assess the target's ambient conditions in terms of visible lighting; processing of the radar data to direct non-radar electromagnetic sensors to the target; and, processing of the radar data and the light measurement data to help optimize the fusion of the respective images of the non-radar electromagnetic sensors.

The present invention is useful for aiding navigation, especially during inclement weather, and can also be used for threat detection. When embodied as a navigational and/or threat detection system, the present invention typically uses plural spectra (i.e., plural regions of the electromagnetic spectrum, e.g., visual, IR, and mmW) to image the "scene," e.g., the area to be navigated. These various single-spectrum imaging devices generate different images of the scene in accordance with the obstacles and other "seeing" conditions within that scene. These digital images are inventively processed using data fusion techniques to generate a "multispectral" image, which is a more accurate image of the scene than any single-spectrum device can generate, and which is displayed to the navigator as a single rendering of the scene.

Many conventional fusion algorithms are attuned to a specific environment (e.g., maritime rain) and/or a specific operational condition. In contrast, the present invention's imaging methodology is "smart" in the sense that it is capable of making adjustments in response to changing environments, and of doing so in a manner resembling human decision-making. According to typical practice of the present invention, radar is initially implemented for detecting objects and determining their positions. Radar is propitious for this purpose, as it is the kind of electromagnetic sensor that is best suited for "seeing" through environmental clutter (i.e., regardless of obscurants) at a wide range of distances.

An inventive imaging system as typically embodied includes an active sensor component (i.e., radar), at least three passive sensor components, and a visible light measurement component. The radar performs functions including detection of an object, aiming (directing) of passive sensor components toward the object, and environmental assessment for optimizing data fusion of respective images of the object from plural passive sensor components. The visible light measurement component also furthers optimization of the data fusion.

According to typical inventive practice, a radar device detects a target and thereupon "cues" the inventive system's passive sensing components, causing them to focus upon the radar-detected target. The radar device also determines atmospheric (e.g., weather/particulate) conditions in the area (space) between the radar device and the target. According to many inventive embodiments, the atmospheric findings of the radar device, along with the measured degree of daylight (e.g., including time of day), dictate the fusion of the respective data, from the passive image sensing components, in terms of selecting or adjusting the amounts or proportionalities of the respective data in the fused imagery. According to some inventive embodiments, the fusion of the respective data is additionally dictated by the radar device's measurement of the distance of the target from the sensory apparatus.

In accordance with typical embodiments of the present invention, the image data received from different passive sensing devices are combined, via data fusion, to yield a composite rendering of the scene that is more informative than would be a rendering yielded by image data from a single passive sensing device. The present invention's passive sensor components typically correspond to at least three different electromagnetic spectral band regions, at least one of which is in the visual range, at least one of which is in the infrared (IR) range, and at least one of which is in the millimeter wave (mmW) range.

Some inventive embodiments may refine the sensing in the IR range by distinguishing between mid-wave infrared (MWIR) radiation and long-wave infrared (LWIR) radiation, which may be affected differently from each other under same atmospheric conditions. Such inventive embodiments may provide for passive sensing components operating in at least four different electromagnetic spectral band regions, at least two of which are in the IR range, e.g., including at least one MWIR region and at least one LWIR region.

Under favorable conditions, passive EO/LI, passive MWIR, and passive LWIR imaging devices individually have excellent resolution. The passive MWIR and passive LWIR devices can identify heat sources, thus imparting additional information to the compositely rendered scene. The resolution of passive mmW is moderate as compared with passive EO/LI or passive IR; nevertheless, inclusion of a passive mmW device, which can see (and hence to some degree be informative) under almost any environmental conditions, practically assures the operational usefulness of the inventive imaging system under even the most extreme inclement weather conditions.

Optionally, upon radar detection and passive sensing of the target, the operator turns off the radar device (the inventive system's active component) in order to render the inventive system completely passive, thereby precluding detection of radar signals by the target. Vis-à-vis an active sensing device, a passive sensing device is advantageous insofar as being covert, since other sensors cannot determine if the passive sensing device is in the area or vicinity.

Uniquely featured by typical embodiments of the present invention is its implementation of plural (e.g., multiple) "operational modes." According to many inventive embodiments, each operational mode corresponds to (i) the amount of visual light (e.g., daylight) in the environment, and (ii) at least one condition (e.g., weather or air-pollutive) that may affect electromagnetic wave propagation in the environment. The amount of ambient visual light may have a bearing especially on inventive determination of the extent to which visual image sensing is to be utilized in the inventive fusion of disparate spectral images. According to some inventive embodiments, each operational mode additionally corresponds to (iii) the distance (or range of distances) of the target from the sensors, or from the vehicle or station in which the sensors are located.

According to frequent inventive practice, the environmental data pertaining to obscuration (radar data) and lighting (time data and/or visible light sensor data) are the two main criteria for choosing the appropriate algorithm for fusing images from among different sensors within the visual, IR, and mmW regions of the electromagnetic spectrum. An operational mode defining modal indices is selected based on the criteria. An algorithm is thus chosen that corresponds to the selected operational mode so as to correspondingly attribute weights (as indicated by the modal indices) to the imaging data from the respective sensors. As the environmental data pertaining to obscuration and lighting changes over time, the inventive system can smartly adapt in real or near-real time so as to adjust the setting to a fusion algorithm that is more or most fitting.

The light measurement component assists the multispectral imaging by sensing ambient visual light conditions, and the radar component assists the multispectral imaging by sensing ambient atmospheric conditions, e.g., in terms of weather-related and non-weather-related particulates. Based on the radar reading and the amount of ambient daylight (which generally correlates to the time of day), the atmospheric conditions existing at a particular moment are categorized into one of several or many operational modes, each operational mode being individually defined in terms of visible lighting and obscuring phenomena.

According to typical inventive logic, a set of several or many different image fusion algorithms is established for being availed of, one image fusion algorithm at a time. A single image fusion algorithm is selected for effectuation in accordance with the environmental profile of the data that is currently gathered. The selection of the appropriate (e.g., best) algorithm for fusing images from various passive electromagnetic sensors is based upon a radar device's sensing of the nature and extent of environmental obscuration, and a non-radar device's sensing of the extent of environmental visible (visual spectrum) lighting.

According to some inventive embodiments, the location of the target as sensed by a radar device is an additional criterion for choosing the appropriate image fusion algorithm, since different spectral regions may have different properties at different propagative distances. The light measurement component assists the multispectral imaging by sensing ambient visual light conditions, the radar component assists the multispectral imaging by sensing ambient atmospheric conditions, and the target location component assists the multispectral imaging by sensing the distance of the target from the sensing devices. The operational modes are based on the radar's environmental reading, the radar's target position reading, and the amount of ambient daylight. As the environmental data pertaining to obscuration and lighting changes over time, and/or the target location data changes over time, the inventive system can smartly adapt in real or near-real time so as to adjust the setting to a fusion algorithm that is more or most fitting.

Other objects, advantages, and features of the present invention will become apparent from the following detailed description of the present invention when considered in conjunction with the accompanying drawings.

BRIEF DESCRIPTION OF THE DRAWINGS

The present invention will now be described, by way of example, with reference to the accompanying drawings, wherein:

FIG. 5 is table showing an example of atmospheric categorization into operational modes, in accordance with the present invention. As shown in FIG. 5, each of eighteen operational modes is defined by one of three prevailing lighting conditions and one of six prevailing visibility conditions. Each operational mode is defined by the predominant ambient lighting character and the predominant ambient visibility/obscuration character.

FIG. 6 and FIG. 7 are respective tables showing different examples of the present invention's association of each operational mode with a particular weighted combination of passive spectral band devices. The eighteen operational modes listed in FIG. 6 and FIG. 7 can be considered, for exemplary purposes, to correspond to those listed in FIG. 5. As shown in FIG. 6, there are three passive spectral band devices, viz., visual, IR, and mmW. As shown in FIG. 7, there are four passive spectral band devices, viz., visual, MWIR, LWIR, and mmW.

FIG. 8 is table similar to FIG. 5 and showing another example of atmospheric categorization into operational modes, in accordance with the present invention. As shown in FIG. 8, each of thirty-six operational modes is defined by one of three prevailing lighting conditions, one of six prevailing visibility conditions, and one of two ranges of target distances. Each operational mode is defined by the predominant ambient lighting character, the predominant ambient visibility/obscuration character, and the distance of the target from the present invention's sensing apparatus.

DESCRIPTION OF EXEMPLARY EMBODIMENTS OF THE INVENTION

Referring now to FIG. 1 through FIG. 4, computer 60 includes a processor 61 and memory/storage 62 (typically, both volatile and non-volatile) for holding and processing data and for running compute software, embodied in computer code. Computer 60 has resident in its memory/storage 62 an embodiment of an image fusion computer program in accordance with the present invention. Connected to computer 60 is display 63, on which are displayed the composite multispectral images generated by computer 60 in accordance with typical practice of the present invention.

The active radar device 10 includes a detection-and-tracking-type radar component 11 and a weather-type radar component 12. Light measurement device 20 is any suitable visual light-measuring means, such as including a clock (timekeeping instrument) 21 and/or a light meter (light sensing device) 22. The passive non-radar electromagnetic sensors include a visible light image data device 30, an infrared image data device 40, and a millimeter wave image data device 50. Depending on the inventive embodiment, IR imaging device 40 can include a single IR band or plural IR bands, typically at least one IR band via a medium wave IR component 41 and at least one IR band via a long wave IR component 42.

The location data component 11 of radar device 10 detects and locates (e.g., finds coordinates of) a target 99. The environmental data component 12 of radar device 10 characterizes the ambient obscurative conditions (e.g., both weather-related conditions and non-weather-related conditions) for the target 99. Weather radar devices and/or pollution radar devices (such as involving Doppler radar) that are conventionally used by meteorological, environmental, and other scientific disciplines may be suitable for inclusion in an environmental data component 12 of radar device 10.

As used herein in the context of typical inventive practice of active radar detection of a target 99, locative information of the target 99 includes at least one of the following: the range (distance) of the target 99; the bearing (direction) of target 99; the speed (velocity) of the target 99; the altitude (height) of the target 99. The location data component 11 of a radar device 10 may include a conventional radar system that is capable of displaying range and/or bearing and/or speed and/or altitude of a target 99 on a radar screen.

Computer 60 is electrically connected (e.g., wiredly or wirelessly) to display 63, radar device 10, visible light measuring device 20, and non-radar electromagnetic image sensing devices 30, 40, and 50. Data acquisition by computer 60 includes receiving data input from the radar device 10 and the light measurement device 20 at an earlier stage, and receiving data input from the non-radar electromagnetic image sensing devices 30, 40, and 50 at a later stage. Radar device 10 transmits target 99 location data and ambient obscuration-related (e.g., weather-related and/or pollution-related) data to computer 60. The duration of active radar sensing of a target—and hence, the associated vulnerability to enemy detection—may be kept to a minimum through immediately inactivation of the radar device upon discovery and weather-assessment of a target 99, the inactivation leaving the inventive composite imaging system with entirely passive, non-radar electromagnetic sensing to be performed by visible imaging device 30 and/or infrared imaging device 40 and/or millimeter wave imaging device 50.

Radar device 10's location data component 11 initially detects a target 99 and transmits target 99 location data to computer 60. Based on radar device 10's target 99 location input, computer 60 transmits target 99 location output to at least two of the three passive non-radar electromagnetic image data devices 30, 40, and 50, thereby activating the imaging functionality of each passive image data device that has received target 99 location information from computer 60. Based on the received target-locative information, each passive non-radar image sensor that has been target-locatively informed zeroes in on target 99. The image-activated non-radar image devices then transmit their respective image data as input to computer 60, which in turn performs multispectral fusion for manifestation on computer display 63.

Figure 1:
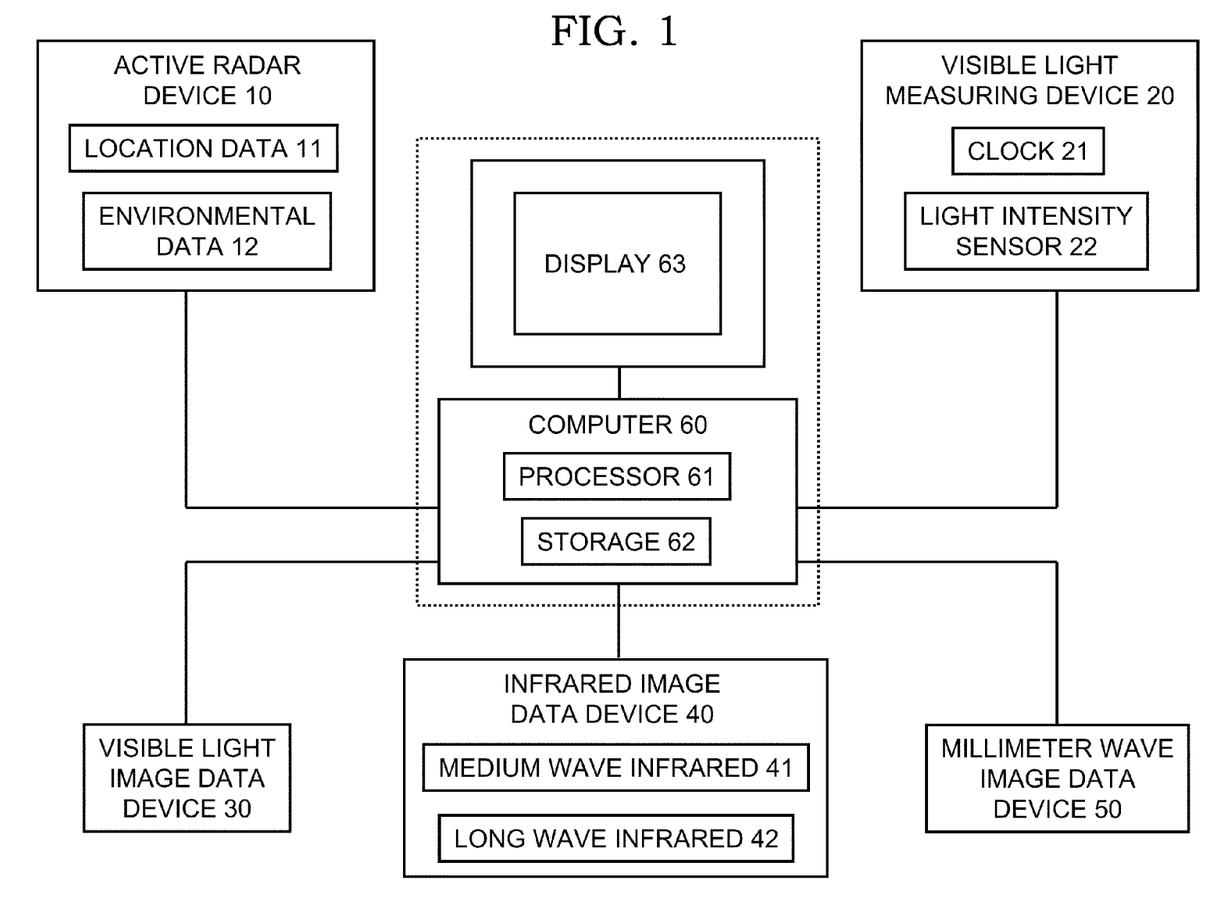
FIG. 1 is a schematic of a multispectral imaging system in accordance with typical embodiments of the present invention.
Figure 2:
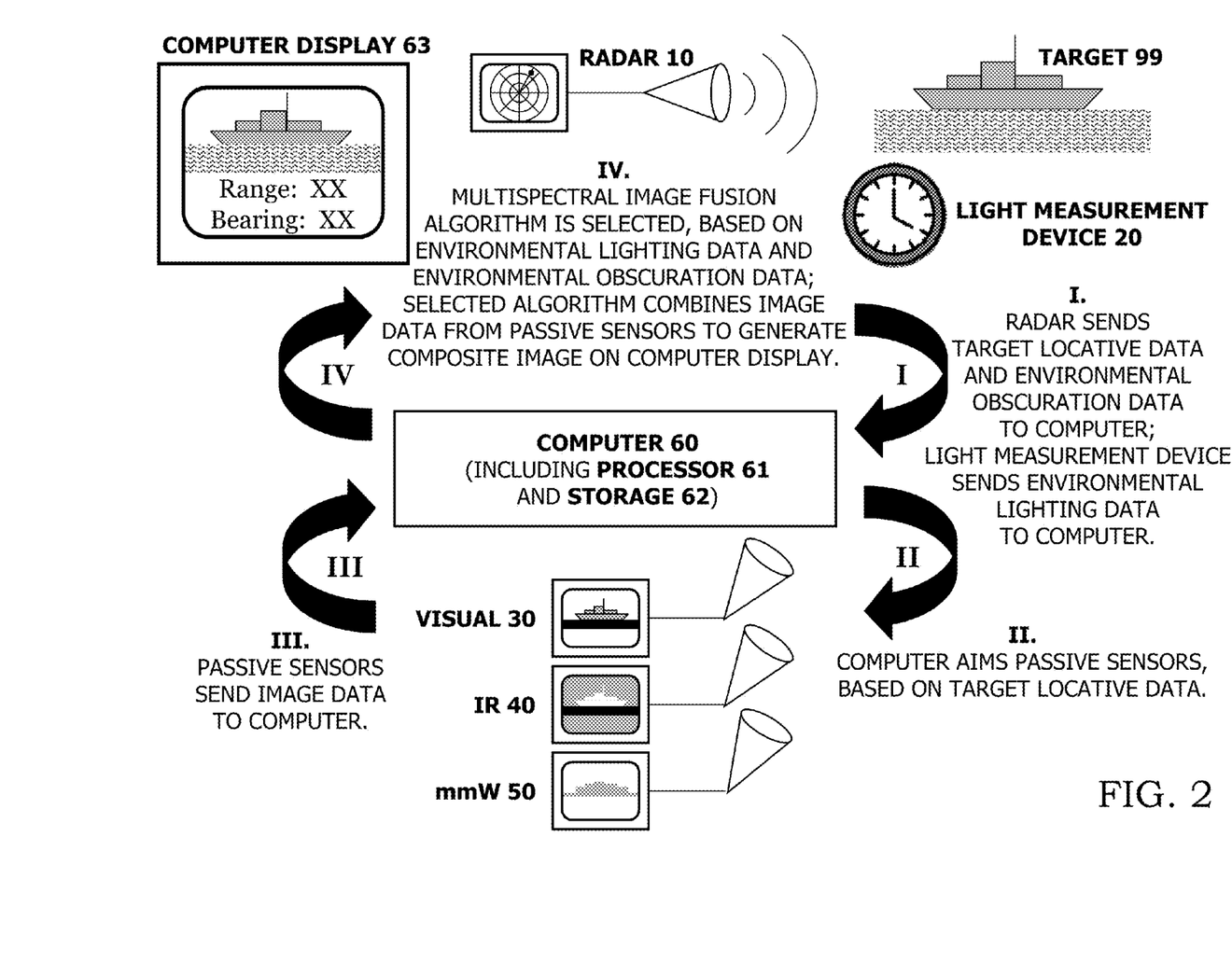
FIG. 2 is a schematic of an inventive multispectral imaging system such as depicted in FIG. 1, and particularly illustrating performance thereby of active and passive sensing, computer processing, and composite imaging.
Figure 3:
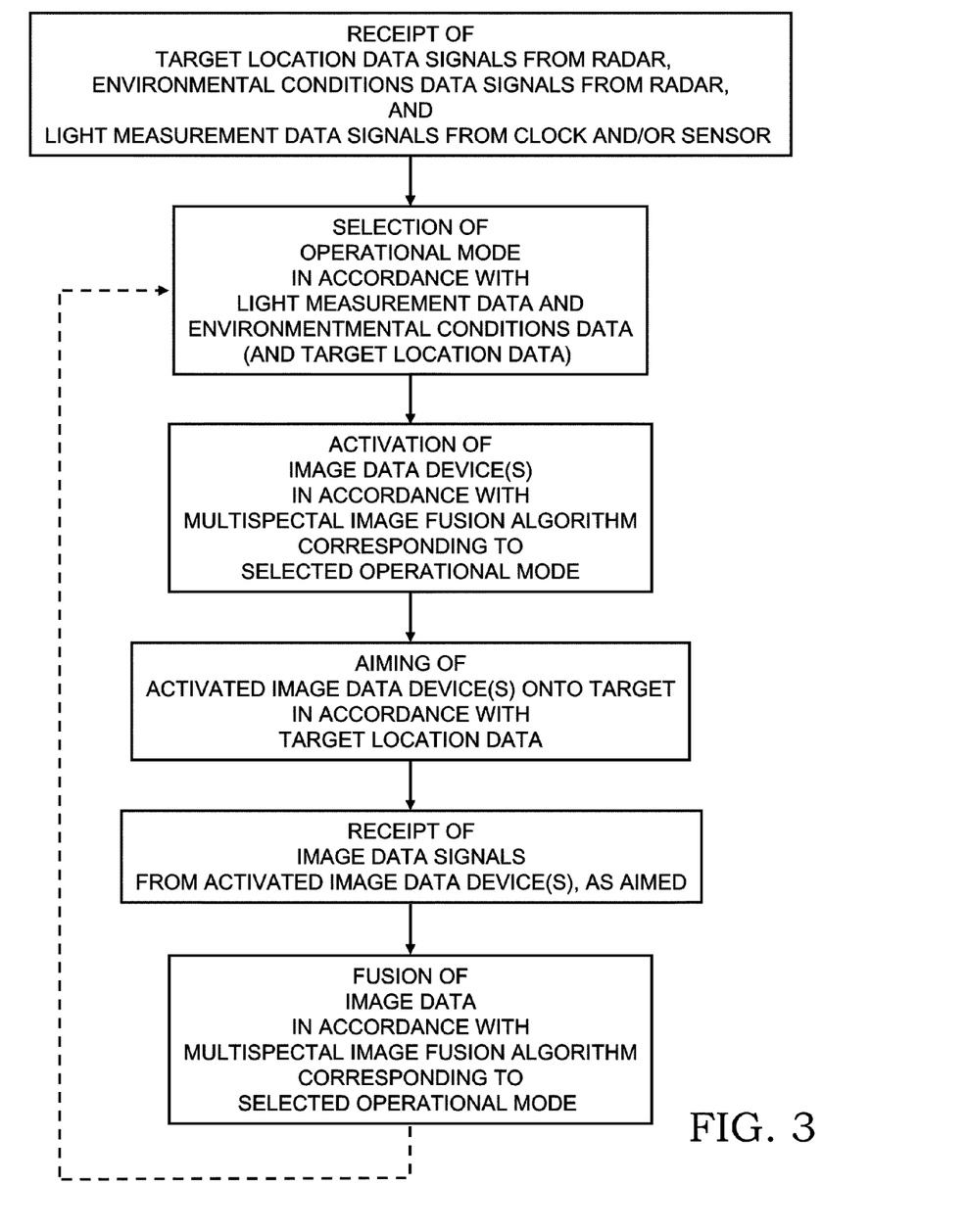
FIG. 3 is a flow diagram of an embodiment of computer logic for performing multispectral imaging in accordance with the present invention.
Figure 4:
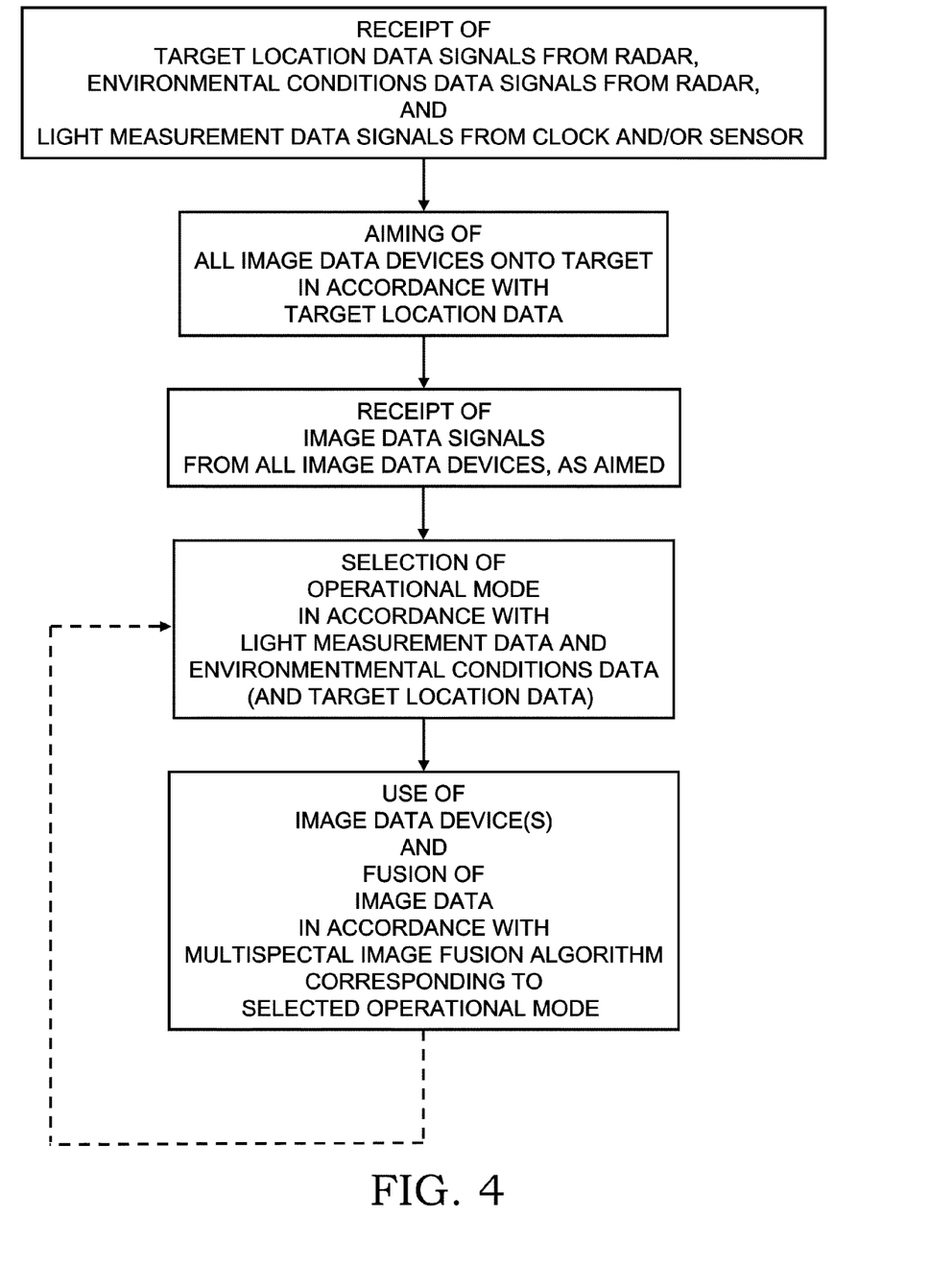
FIG. 4 is a flow diagram, similar to FIG. 3, of another embodiment of computer logic for performing multispectral imaging in accordance with the present invention.

FIG. 3 and FIG. 4 illustrate two preferred approaches of the present invention to acquiring, processing, and displaying sensory data and to controlling sensory instrumentation. According to each of the inventive approaches outlined in FIG. 3 and FIG. 4, computer 60 receives target location data signals from the location data component 11 of radar device 10, environmental conditions data signals from the environmental data component 12 of radar device 10, and light measurement data signals from visible light measurement device 20. FIG. 3 and FIG. 4 differ primarily insofar as which passive image devices are activated and aimed, and when. As compared with the FIG. 3 approach, the FIG. 4 approach may more readily lend itself to quickly transitioning between operational modes, since all passive image devices of the FIG. 4 approach are "ready" (in an active state) and aimed on a continual basis. Whether of a FIG. 3 type or a FIG. 4 type, the present invention can be embodied so as to operate or be operable in a continuous loop of iteratively selecting the operational mode, the inventive system thereby adapting in real time or near-real time to changing environmental (lighting and obscurative) conditions, or to changing environmental and target-locative conditions.

In FIG. 3, only those passive image devices that comport with the selected operational mode are activated from an inactive state, and are aimed and utilized for composite imaging. FIG. 3 prescribes that the operational mode is selected based on the light measurement data and the environmental conditions data (or on the light measurement data, the environmental conditions data, and the target distance data) received by computer 60. Then, only the "pertinent" passive image devices, i.e., only those passive image devices designated for activation according to the selected operational mode, are activated by computer 60. The pertinent passive image devices are aimed in accordance with the target location data. Image data from the respective pertinent passive image devices are fused by computer 60, and the fused image data are displayed by display 63.

In FIG. 4, on a continual basis, all of the passive image devices are "ready" (in an active state) and are aimed (based on radar location component 11 data). However, only those passive image devices that comport with the selected operational mode are utilized for composite imaging. FIG. 4 prescribes that, depending on the inventive embodiment, either all of the passive image devices are in a constant state of activity, or all of the passive image devices are activated by computer 60 upon its receipt of target location data. In either case, computer 60 aims all of the passive image devices in accordance with the target location data. As in FIG. 3, in FIG. 4 the operational mode is selected based on the light measurement data and the environmental conditions data (or on the light measurement data, the environmental conditions data, and the target distance data) received by computer 60. Computer 60 selects the pertinent passive image devices as determined by the selected operational mode, and the fused image data are displayed by display 63.

Still with reference to FIG. 1 through FIG. 4, and also with reference to FIG. 5 through FIG. 8, the multispectral fusion performed by computer 60 includes selective application of the environmental conditions-based fusion algorithm that optimizes the fusing of the respective images of the non-radar (passive) sensors. This algorithmic image fusion optimization involves a kind of "balancing" of the respective images of the passive image sensing devices in accordance with the radar device 10's environmental obscuration data and the light measuring device 20's environmental lighting data.

FIG. 5 through FIG. 8 typify inventive practice insofar as providing for discrete "operational modes," among which one operational mode is to be selected for effectuating the multispectral fusion algorithm to be applied to a given scene at a give point in time. As illustrated by FIG. 5 through FIG. 8, each operational mode of inventive operation: (i) is characterized by activation of two or more designated passive electromagnetic image devices; and, (ii) has associated therewith a designated preprogrammed image-fusion algorithm that is specifically formulated to combine in a particular way the respective images of the activated passive electromagnetic image devices. The image data input that computer 60 receives from each individual passive imaging device is processed (i.e., algorithmically fused) by computer 60 to form multispectral image data, which is then transmitted as output from computer 60 to display 63 and displayed as a single composite multispectral image.

Depending on the inventive embodiment, a given operational mode can be defined so as to entail greater or lesser specificity as to the lighting and obscurative conditions (or, as to the lighting, obscurative, and target-distance conditions). For instance, an operational mode can be complexly defined by respective magnitudes of environmental criteria including daylight, rain, fog, pollution, etc. Moreover, as another example of inventive practice, a sliding scale can be employed for each environmental criterion so that a particular operational mode, having associated therewith an adaptable algorithm for blending variable data from passive electromagnetic imagery sensing devices, is arrived at based on a particular set of circumstances. In this manner, operational modes are dynamically and uniquely determined on an ad hoc basis in accordance with changing circumstances.

As exemplified by FIG. 5 through FIG. 8, more frequent inventive practice "pre-defines" each operational mode in terms of overall conditions, especially what conditions predominate (prevail) with respect to plural parameters. A first parameter, which is an environmental parameter, is the predominant ambient lighting character. A second parameter, which is also an environmental parameter, is the predominant ambient visibility (obscuration) character. A third parameter, which is a non-environmental parameter, is the distance (or range of distances) of target 99 from the vehicle or station that houses the sensors 10, 20, 30, 40, and 50.

The above-said first parameter describes the predominant state of the environment with respect to the amount of lighting. This, the predominant ambient lighting character, is determined by light measurement means 20 including a time-of-day device (e.g., clock or other time instrument) 21 and/or by a light sensing device (e.g., light meter) 22. Examples of first-parameter descriptors include daytime, twilight, nighttime, dawn, dusk, etc.

The above-said second parameter describes the predominant state of the environment with respect to whether obscuration exists and, if so, the nature of the obscuration. This, the predominant ambient obscuration/visibility character, is determined by the environmental data component 12 of radar device 10. Examples of second-parameter descriptors include clear, moderate rain, heavy rain, non-rain precipitation, moderate air pollution, heavy air pollution, etc.

Some inventive embodiments incorporate a third, non-environmental parameter into the inventive analysis, namely, the distance of the target from the sensory apparatus. Target distance is determined by the location data 11 component of active radar device 10. According to typical such inventive practice, each operational mode is pre-defined in terms of the two above-noted environmental parameters (i.e., the first and second parameters) as well as the third parameter. Third-parameter descriptors may include, for instance, "less than x meters," or "between "x nautical miles and y nautical miles," or "at least z kilometers," etc.

Figure 5:
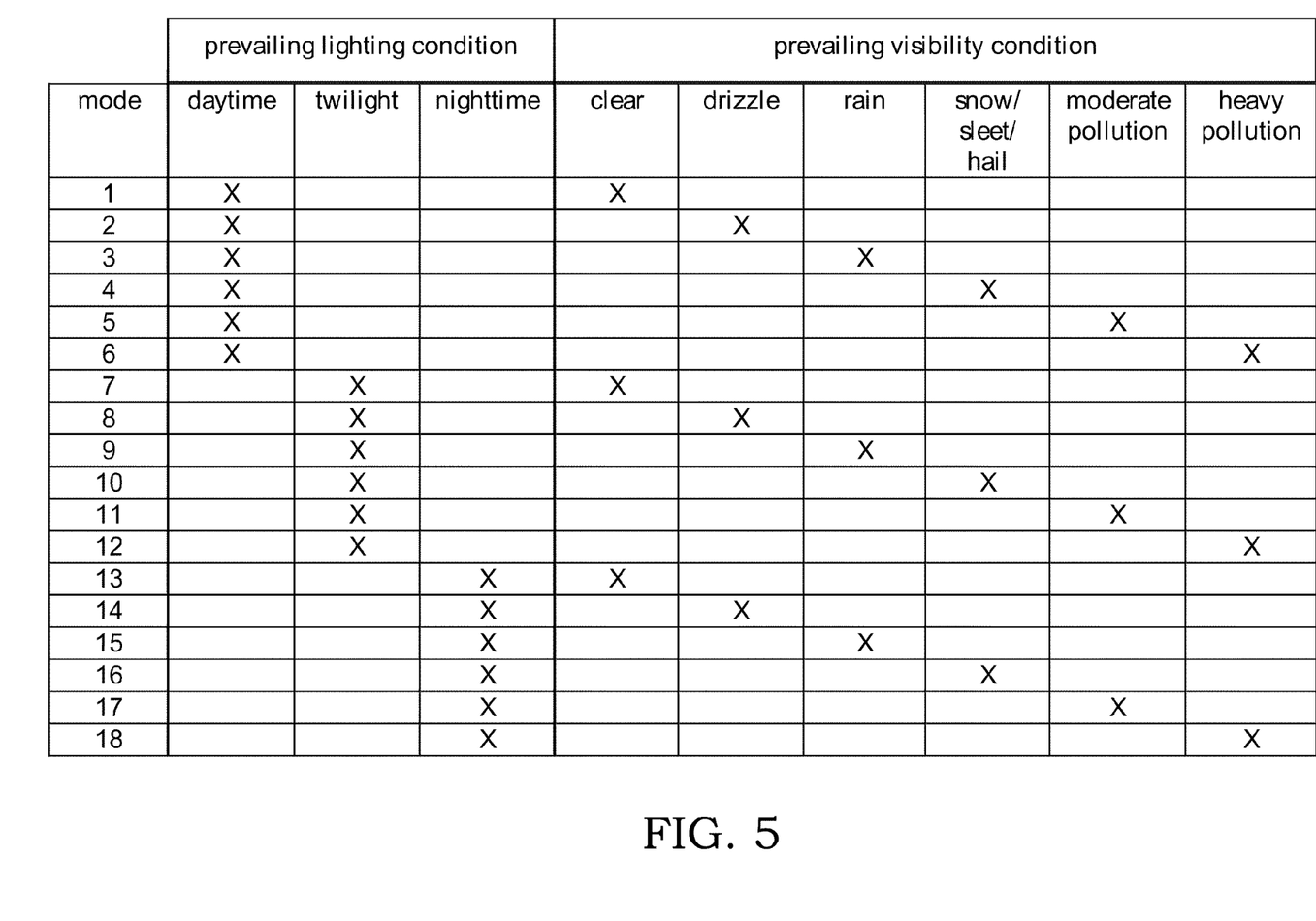
Figure 6:
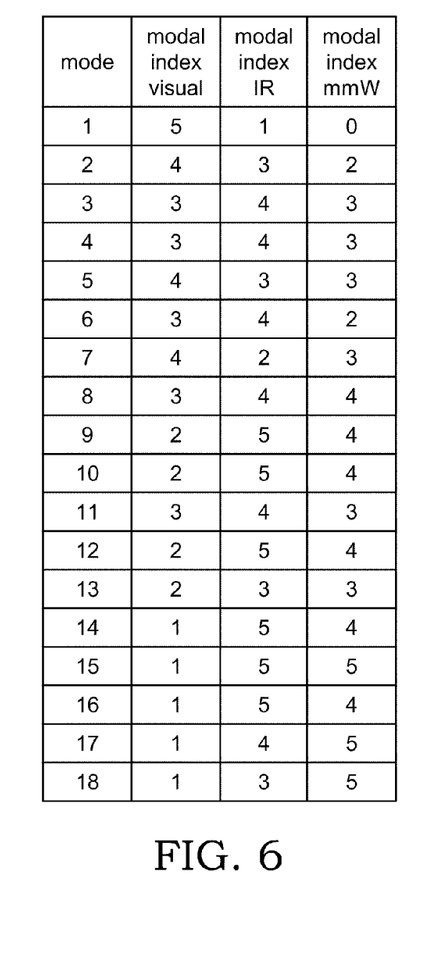
Figure 7:
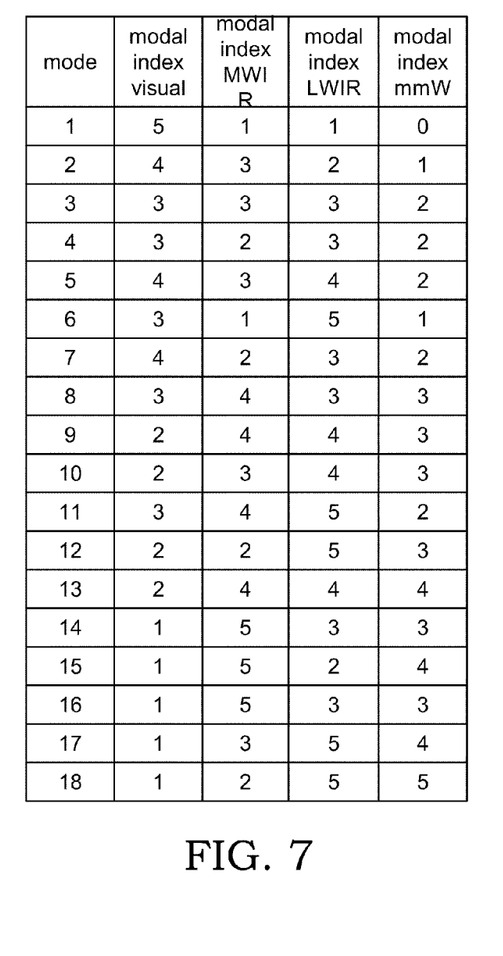

Each operational mode set forth in FIG. 5 through FIG. 7 is defined by two environmental parameters, viz., one visual light intensity categorization and one electromagnetic propagation influence categorization. The visual light intensity categorization describes the prevailing lighting character of the target scene. The electromagnetic propagation influence categorization describes the prevailing visibility (obscuration) character of the target scene. As shown in FIG. 5, there are three visual light intensity categorizations (viz., daytime, twilight, and nighttime), and six electromagnetic propagation influence categorizations (viz., clear, light rain, rain, non-rain precipitation, moderate air pollution, and heavy air pollution).

Figure 8:
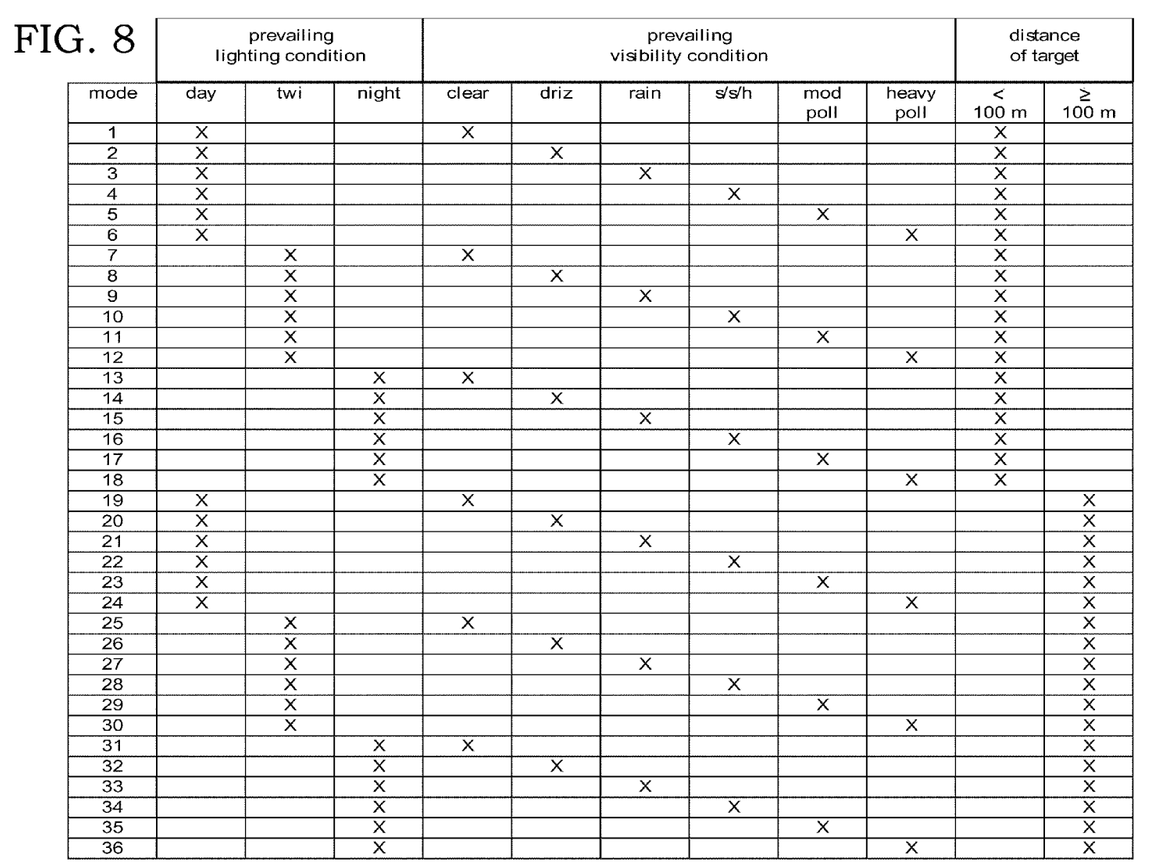

Each operational mode set forth in FIG. 8 is defined by two environmental parameters and one non-environmental parameter, viz., one visual light intensity categorization, one electromagnetic propagation influence categorization, and one target distance range categorization. There are three visual light intensity categorizations (viz., daytime, twilight, and nighttime), six electromagnetic propagation influence categorizations (viz., clear, light rain, rain, non-rain precipitation, moderate air pollution, and heavy air pollution), and two target distance range categorizations (viz., less than 100 meters, greater than or equal to 100 meters).

FIG. 6 illustrates three passive imaging devices, each covering a different region in the overall electromagnetic spectrum. Each operational mode shown in FIG. 6 is associated with a combination of passive electromagnetic sensing devices selected from among visible spectrum sensing device, IR sensing device, and mmW sensing device. FIG. 7 illustrates four passive imaging devices, each covering a different region in the overall electromagnetic spectrum. Each operational mode shown in FIG. 7 is associated with a combination passive electromagnetic sensing devices selected from among visible spectrum sensing device, MWIR sensing device, LWIR sensing device, and mmW sensing device.

Unlike FIG. 6, FIG. 7 distinguishes between two sub-regions of the IR region of the electromagnetic spectrum. A notable difference between MWIR radiation and LWIR radiation is that MWIR tends to propagate better than LWIR in the presence of aqueous particulate (precipitation, e.g., rain, snow, etc.), whereas LWIR tends to propagate better than MWIR in the presence of dry particulate (non-precipitation, e.g., pollution, dust, smoke, etc.).

The inventive embodiment shown in FIG. 5 has eighteen operational modes, as follows: "daytime clear" mode; "twilight clear" mode; "nighttime clear" mode; "daytime rain" mode; "twilight rain" mode; "nighttime rain" mode; "daytime drizzle" mode; "twilight drizzle" mode; "nighttime drizzle" mode; "daytime snow/sleet/hail" mode; "twilight snow/sleet/hail" mode; "nighttime snow/sleet/hail" mode; "daytime moderate pollution" mode; "daytime heavy pollution" mode; "twilight moderate pollution" mode; "twilight heavy pollution" mode; "nighttime moderate pollution" mode; and, "nighttime heavy pollution" mode.

As illustrated in each of FIG. 6 and FIG. 7, the tabular rows individually correspond to the operational modes, and the tabular columns individually correspond to the electromagnetic spectra (regions). Each operational mode is described in its own tabular row by a set of values (e.g., numbers, symbols, or designations) referred to herein as "operational modal indices," which afford comparative information as to the relative weights of the respective imaging data in image fusion from the various electromagnetic regions. Each modal index represents a magnitude that is indicative of how strongly that electromagnetic region's imaging data is to be incorporated into the image fusing of the respective imaging data of all of the electromagnetic regions, in accordance with that operational mode. Each operational mode has associated therewith its own multispectral image fusion algorithm, which reflects the corresponding set of modal indices. The operational modes thus generally distinguish from each other insofar as how the respective image data are fused (combined) in the associated image fusion algorithm.

A set of three modal indices is shown in FIG. 6 to be associated with each operational mode. A set of four image-fusion indices is shown in FIG. 7 to be associated with each operational mode. For each operational mode, the modal index of each electromagnetic region is valued on a scale from zero to five, where zero means no usage by computer 60, and five means maximum usage by computer 60, of the image data from that electromagnetic spectrum's passive device. Operational modes "two" through "eighteen" call for usage of image data of every passive imaging device, with the modal indices ranging between one and five. Only mode "one" calls for nonuse of any passive imaging device, in this case nonuse of the mmW device. Each operational mode has corresponding thereto the individual set of modal indices representing optimal image fusion for that mode.

Although FIG. 6 and FIG. 7 illustrate use of image data from every passive imaging device in practically every operational mode, inventive practice is possible in diverse ways terms of how many passive imaging devices are availed of in each operational mode. According to some inventive embodiments, a given operational mode may have only one passive imaging device (for one region of the electromagnetic spectrum) designated for that mode, thus representing a single-spectrum imaging rather than the multispectral imaging that occurs when two or more passive imaging devices are designated. Nevertheless, more typical inventive practice provides for fusion of two or more spectral images for every operational mode.

For instance, consistent with the modal scheme of FIG. 6, any one of the following combinations of plural passive non-radar electromagnetic image data devices can be used in the image fusion: visual device 30, IR device 40, mmW device 50; visual device 30, IR device 40; visual device 30, mmW device 50; IR device 40, mmW device 50. The number of combinations increases if bandwidth distinctions are drawn within a given spectral region, such as distinguishing between medium wave infrared and long wave infrared in a manner such as depicted in FIG. 7, with the following combinatorial result: visual device 30, MWIR device 41, LWIR device 42, mmW device 50; visual device 30, MWIR device 41, mmW device 50; visual device 30, LWIR device 42, mmW device 50; MWIR device 41, LWIR device 42, mmW device 50; visual device 30, MWIR device 41; visual device 30, LWIR device 42; visual device 30, mmW device 50; MWIR device 41, mmW device 50; LWIR device 42, mmW device 50.

As shown in FIG. 6 and FIG. 7, each operational mode has an image fusion algorithm providing for data fusion of the passive sensing devices in accordance with that operational mode's modal indices, which in turn are in accordance with the electromagnetic propagative conditions (e.g., obscuration, visual lighting, target distance) that define that operational mode. The set of modal indices characterizing each image fusion algorithm reflects how the strengths or intensities of the respective electromagnetic regional images should be apportioned in order to optimize the fusion thereof.

To illustrate, let us assume that, in a first case, the radar determines clear weather during daylight hours. The image fusion may therefore emphasize the visible spectrum and deemphasize the IR and mmW bands. In a second case, the radar may determine clear weather during nighttime hours. Here, vis-à-vis the first case, because of the evening darkness the fusion may deemphasize the visible spectrum and emphasize the mmW band and especially the IR band, as IR energy and mmW energy are each unaffected by the degree of ambient visible light.

In a third case, the radar may sense precipitation (e.g., heavy rain) during daytime hours. In the third case, the fusion may render the visible image component to be less intense than it would be on a clear day (because of the rain), but more intense than it would be at night (because of the daylight). The third-case fusion may similarly render the IR image to be less intense than it would be on a clear day, but the time of day (daylight versus nighttime) would not factor into IR imagery determination, since IR energy is unaffected by the degree of ambient visible light. Perhaps more importantly, the third-case fusion may render the mmW image to be significantly more prominent under these optical conditions, since mmW energy is singularly effective regardless of weather, albeit the time of day (daylight versus nighttime) would not factor into mmW imagery determination, since mmW energy (like IR energy) is unaffected by the degree of ambient visible light. In a fourth case, the radar may sense precipitation (e.g., heavy rain) during nighttime hours. In the fourth case, the image-intensity proportions may parallel those of the third case, except that visible light is accorded less prominence than in the third case because of the nighttime darkness.

FIG. 5 addresses two image-affective criteria (visual light intensity and electromagnetic propagation influence), whereas FIG. 8 addresses three image-affective criteria (visual light intensity, electromagnetic propagation influence, target distance). As distinguished from FIG. 5 through FIG. 7, each operational mode listed in FIG. 8 is defined by one visual light intensity categorization, one electromagnetic propagation influence categorization, and one target distance categorization. FIG. 8 shows three visual light intensity categorizations (viz., daytime, twilight, and nighttime), six electromagnetic propagation influence categorizations (viz., clear, light rain, rain, non-rain precipitation, moderate air pollution, and heavy air pollution), and two target distance categorizations (viz., less than 100 meters, greater than or equal to 100 meters).

The distance of the target from the passive imaging devices may be especially significant in the IR and mmW spectra. The inventive embodiment shown in FIG. 8 has thirty-six operational modes, which doubly incorporates the eighteen operational modes shown in FIG. 5. Modes one through eighteen of FIG. 8 combine target distance<100 meters with modes one through eighteen of FIG. 5. Modes nineteen through thirty-six of FIG. 8 combine target distance<100 meters with modes one through eighteen of FIG. 5.

FIG. 5 through FIG. 8 are illustrative of the present invention by way of example, as inventive practice lends itself to defining as few or as many operational modes as desired, and defining them with as little or great specificity as desired. For instance, rain can be broken down into light rain, moderate rain, and heavy rain. Snow can be broken down into light snow, moderate snow, and heavy snow. And so on . . . . Operational modes need not be defined in terms of a single overriding lighting condition and a single overriding obscuration condition, as exemplified by FIG. 5 through FIG. 7. Similarly, operational modes need not be defined in terms of a single overriding lighting condition, a single overriding obscuration condition, and a single target distance, as exemplified by FIG. 8. Instead, inventive practice can more complicatedly define multiple operational modes by diverse combinations from among multifarious operational descriptors.

The present invention, which is disclosed herein, is not to be limited by the embodiments described or illustrated herein, which are given by way of example and not of limitation. Other embodiments of the present invention will be apparent to those skilled in the art from a consideration of the instant disclosure or from practice of the present invention. Various omissions, modifications and changes to the principles disclosed herein may be made by one skilled in the art without departing from the true scope and spirit of the present invention, which is indicated by the following claims.

What is claimed is:

1. A computer-implemented multispectral imaging method comprising:
   establishing a set of operational modes, each said operational mode corresponding to circumstance including a prevailing environmental character as generally exists between a target and plural imaging devices, each said operational mode being characterized by modal indices individually assigned to said imaging devices, each said operational mode having associated therewith an image fusion algorithm for performing multispectral imaging of said target, said prevailing environmental character including a prevailing obscuration character and a prevailing visual lighting character, said imaging devices including a visual said imaging device, an infrared said imaging device, and a millimeter wave said imaging device, said modal indices being indicative of weighting, by the associated said image fusion algorithm, of imaging data respectively obtainable from said imaging devices;
   obtaining target location data from a radar device, said target location data being informative of the location of said target;
   obtaining visual light data from a visual light measurement device, said visual light data being informative of said prevailing visual lighting character;
   obtaining environmental data from a radar device, said environmental data being informative of said prevailing environmental character;
   aiming at least two said imaging devices toward said target, said aiming of said imaging devices being based on the obtained said target location data;
   selecting a said operational mode, said selection of said operational mode being based on the obtained said environmental data; and
   executing said image fusion algorithm associated with the selected said operational mode, said execution of the associated said operational mode including obtaining imaging data from at least two of the aimed said imaging devices, fusing the obtained said imaging data, and displaying an image representative of said fusion of the obtained said imaging data.

2. The computer-implemented method of claim 1, wherein said prevailing obscuration character describes the nature and degree of environmental obscuration.

3. The computer-implemented method of claim 1, wherein the infrared said imaging device includes a mid-wave infrared device and a long-wave infrared device.

4. The computer-implemented method of claim 1, wherein said visual light measurement device includes at least one of a timekeeping device and a light meter.

5. The computer-implemented method of claim 1, wherein said circumstance to which each said operational mode corresponds further includes the distance of said target from said imaging devices, and wherein said selection of said operational mode is further based on the obtained said target location data.

6. The computer-implemented method of claim 1, wherein said aiming is of all said imaging devices toward said target, and wherein said obtaining of said imaging data is from all said imaging devices.

7. A multispectral imaging system comprising a computer, a display, a radar device, a visual light measurement device, and plural imaging devices, said imaging devices including a visual said imaging device, an infrared said imaging device, and a millimeter wave said imaging device, said computer communicating with said display, said radar device, said visual light measurement device, and said imaging devices, said computer being configured to perform a method including:
   establishing a set of operational modes, each said operational mode corresponding to circumstance including a prevailing environmental character as generally exists between a target and said imaging devices, each said operational mode being characterized by modal indices individually assigned to said imaging devices, each said operational mode having associated therewith an image fusion algorithm for performing multispectral imaging of said target, said prevailing environmental character including a prevailing obscuration character and a prevailing visual lighting character, said modal indices being indicative of weighting, by the associated said image fusion algorithm, of imaging data respectively obtainable from said imaging devices;
   obtaining target location data from said radar device, said target location data being informative of the location of a target;
   obtaining visual light data from said visual light measurement device, said visual light data being informative of said prevailing visual lighting character;
   obtaining environmental data from said radar device, said environmental data being informative of said prevailing environmental character;
   aiming at least two said imaging devices toward said target, said aiming of said imaging devices being based on the obtained said target location data;
   selecting a said operational mode, said selection of said operational mode being based on the obtained said environmental data; and
   executing said image fusion algorithm associated with the selected said operational mode, said execution of the associated said operational mode including obtaining imaging data from at least two of the aimed said imaging devices, fusing the obtained said imaging data, and displaying on said display an image representative of said fusion of the obtained said imaging data.

8. The multispectral imaging system of claim 7, wherein said prevailing obscuration character describes the nature and degree of environmental obscuration.

9. The multispectral imaging system of claim 7, wherein the infrared said imaging device includes a mid-wave infrared device and a long-wave infrared device.

10. The multispectral imaging system of claim 7, wherein said visual light measurement device includes at least one of a timekeeping device and a light meter.

11. The multispectral imaging system of claim 7, wherein said circumstance to which each said operational mode corresponds further includes the distance of said target from said imaging devices, and wherein said selection of said operational mode is further based on the obtained said target location data.

12. The multispectral imaging system of claim 7, wherein said aiming is of all said imaging devices toward said target, and wherein said obtaining of said imaging data is from all said imaging devices.

13. A computer program product for use in association with sensory apparatus in order to effect multispectral imaging, the computer program product comprising a computer-readable storage medium having computer-readable program code portions stored therein, the computer-readable program code portions including:

a first executable portion for establishing a set of operational modes, each said operational mode corresponding to circumstance including a prevailing environmental character as generally exists between a target and plural imaging devices, each said operational mode being characterized by modal indices individually assigned to said imaging devices, each said operational mode having associated therewith an image fusion algorithm for performing multispectral imaging of said target, said prevailing environmental character including a prevailing obscuration character and a prevailing visual lighting character, said imaging devices including a visual said imaging device, an infrared said imaging device, and a millimeter wave said imaging device, said modal indices being indicative of weighting, by the associated said image fusion algorithm, of imaging data respectively obtainable from said imaging devices;

a second executable portion for obtaining target location data from a radar device, said target location data being informative of the location of said target;

a third executable portion for obtaining visual light data from a visual light measurement device, said visual light data being informative of said prevailing visual lighting character;

a fourth executable portion for obtaining environmental data from a radar device, said environmental data being informative of said prevailing environmental character;

a fifth executable portion for aiming at least two said imaging devices toward said target, said aiming of said imaging devices being based on the obtained said target location data;

a sixth executable portion for selecting a said operational mode, said selection of said operational mode being based on the obtained said environmental data; and a seventh executable portion for obtaining imaging data from at least two of the aimed said imaging devices; and an eighth executable portion for fusing the obtained said imaging data in accordance with said image fusion algorithm associated with the selected said operational mode.

14. The computer program product of claim 13, wherein said prevailing obscuration character describes the nature and degree of environmental obscuration.

15. The computer program product of claim 13, wherein the infrared said imaging device includes a mid-wave infrared device and a long-wave infrared device.

16. The computer program product of claim 13, wherein said visual light measurement device includes at least one of a timekeeping device and a light meter.

17. The computer program product of claim 13, wherein said circumstance to which each said operational mode corresponds further includes the distance of said target from said imaging devices, and wherein said selection of said operational mode is further based on the obtained said target location data.

18. The computer program product of claim 13, wherein said aiming is of all said imaging devices toward said target, and wherein said obtaining of said imaging data is from all said imaging devices.

19. The computer program product of claim 13, wherein said fifth executable portion is for aiming only those said imaging devices whose imaging data are fused in accordance with said image fusion algorithm associated with the selected said operational mode, and wherein said seventh executable portion is for obtaining imaging data from all of the aimed said imaging devices.

20. The computer program product of claim 13, wherein the computer program product is additionally for use in association with a display, and wherein the computer-readable program code portions include a ninth executable portion for displaying an image representative of said fusion of the obtained said imaging data.

* * * * *